US012571899B2

(12) United States Patent
Griggs

(10) Patent No.: US 12,571,899 B2
(45) Date of Patent: *Mar. 10, 2026

(54) OBJECT TRACKING IN AN AREA OF DISTRIBUTED SENSORS

(71) Applicant: Databuoy Corporation, Vienna, VA (US)

(72) Inventor: Kathleen Ann Griggs, Vienna, VA (US)

(73) Assignee: Databuoy Corporation, Vienna, VA (US)

( * ) Notice: Subject to any disclaimer, the term of this patent is extended or adjusted under 35 U.S.C. 154(b) by 443 days.

This patent is subject to a terminal disclaimer.

(21) Appl. No.: 18/211,753

(22) Filed: Jun. 20, 2023

(65) Prior Publication Data

US 2023/0350048 A1 Nov. 2, 2023

Related U.S. Application Data

(63) Continuation of application No. 17/152,846, filed on Jan. 20, 2021, now Pat. No. 11,740,347, which is a continuation of application No. 16/034,166, filed on Jul. 12, 2018, now Pat. No. 10,921,437.

(60) Provisional application No. 62/532,032, filed on Jul. 13, 2017.

(51) Int. Cl.
| | |
|---|---|
| *G01S 13/66* | (2006.01) |
| *G01S 13/72* | (2006.01) |
| *G01S 13/87* | (2006.01) |
| *G01S 13/58* | (2006.01) |

(52) U.S. Cl.
CPC .............. *G01S 13/66* (2013.01); *G01S 13/72* (2013.01); *G01S 13/87* (2013.01); *G01S 13/58* (2013.01)

(58) Field of Classification Search
CPC .......... G01S 13/58; G01S 13/66; G01S 13/72; G01S 13/87
See application file for complete search history.

(56) References Cited

U.S. PATENT DOCUMENTS

2017/0010614 A1* 1/2017 Shashua ............... G05D 1/0219

* cited by examiner

*Primary Examiner* — Timothy A Brainard
(74) *Attorney, Agent, or Firm* — Leveque Intellectual Property Law, P.C.

(57) ABSTRACT

A sequence of motion observations of a moving object are received from a first set of sensors. A first sequence of distance ratios are calculated based on the first sequence of motion observations. First transects are generated based on the first sequence of distance ratios. A first motion track of the moving object is produced based on: the first transects; and a map. A second set of sensors are determined employing the map. A second sequence of motion observations of the moving object are received from the second set of sensors. A second sequence of distance ratios for second pairs of the second set of sensors based on the second sequence of motion observations. Second transects are generated based on the second sequence of distance ratios. A second motion track is produced based on the first motion track, the second transects, and the map.

15 Claims, 15 Drawing Sheets

| Range (m) | -30m | -20m | -10m | 0 | 10m | 20m | 30m |
|---|---|---|---|---|---|---|---|
| 30m | .026 - .500 | .031 - .589 | .035 - .671 | .037 - .708 | .035 - .671 | .031 - .589 | .026 - .500 |
| 20m | .031 - .589 | .040 - .751 | .050 - .949 | .056 – 1.06 | .050 - .949 | .040 - .751 | .031 - .589 |
| 10m | .035 - .671 | .050 - .949 | .079 – 1.50 | .112 – 2.12 | .079 – 1.50 | .050 - .949 | .035 - .671 |
| 0 | .037 - .708 | .056 – 1.06 | .112 – 2.12 | Observer 101 | .112 – 2.12 | .056 – 1.06 | .037 - .708 |
| -10m | .035 - .671 | .050 - .949 | .079 – 1.50 | .112 – 2.12 | .079 – 1.50 | .050 - .949 | .035 - .671 |
| -20m | .031 - .589 | .040 - .751 | .050 - .949 | .056 – 1.06 | .050 - .949 | .040 - .751 | .031 - .589 |
| -30m | .026 - .500 | .031 - .589 | .035 - .671 | .037 - .708 | .035 - .671 | .031 - .589 | .026 - .500 |

Table 1: Grid of angular frequency ranges (degrees/second) as a function of distances from Observer 101 (where the object is traveling at speeds of 2 m/s to 42 m/sec)

FIG. 2

| Range (m) | 30m | 20m | 10m | 0 | -10m | -20m | -30m |
|---|---|---|---|---|---|---|---|
| 30m | 0.053 | 0.062 | 0.071 | 0.075 | 0.071 | 0.062 | 0.053 |
| 20m | 0.062 | 0.079 | 0.100 | 0.112 | 0.100 | 0.079 | 0.062 |
| 10m | 0.071 | 0.100 | 0.158 | 0.224 | 0.158 | 0.100 | 0.071 |
| 0 | 0.075 | 0.112 | 0.224 | Observer 101 | 0.224 | 0.112 | 0.075 |
| -10m | 0.071 | 0.100 | 0.158 | 0.224 | 0.158 | 0.100 | 0.071 |
| -20m | 0.062 | 0.079 | 0.100 | 0.112 | 0.100 | 0.079 | 0.062 |
| -30m | 0.053 | 0.062 | 0.071 | 0.075 | 0.071 | 0.062 | 0.053 |

Table 1: Grid of angular frequencies (degrees/second) as a function of distances from Observer 101 (where the object is traveling at a velocity of 4.5 m/s)

FIG. 3

Figure 7:
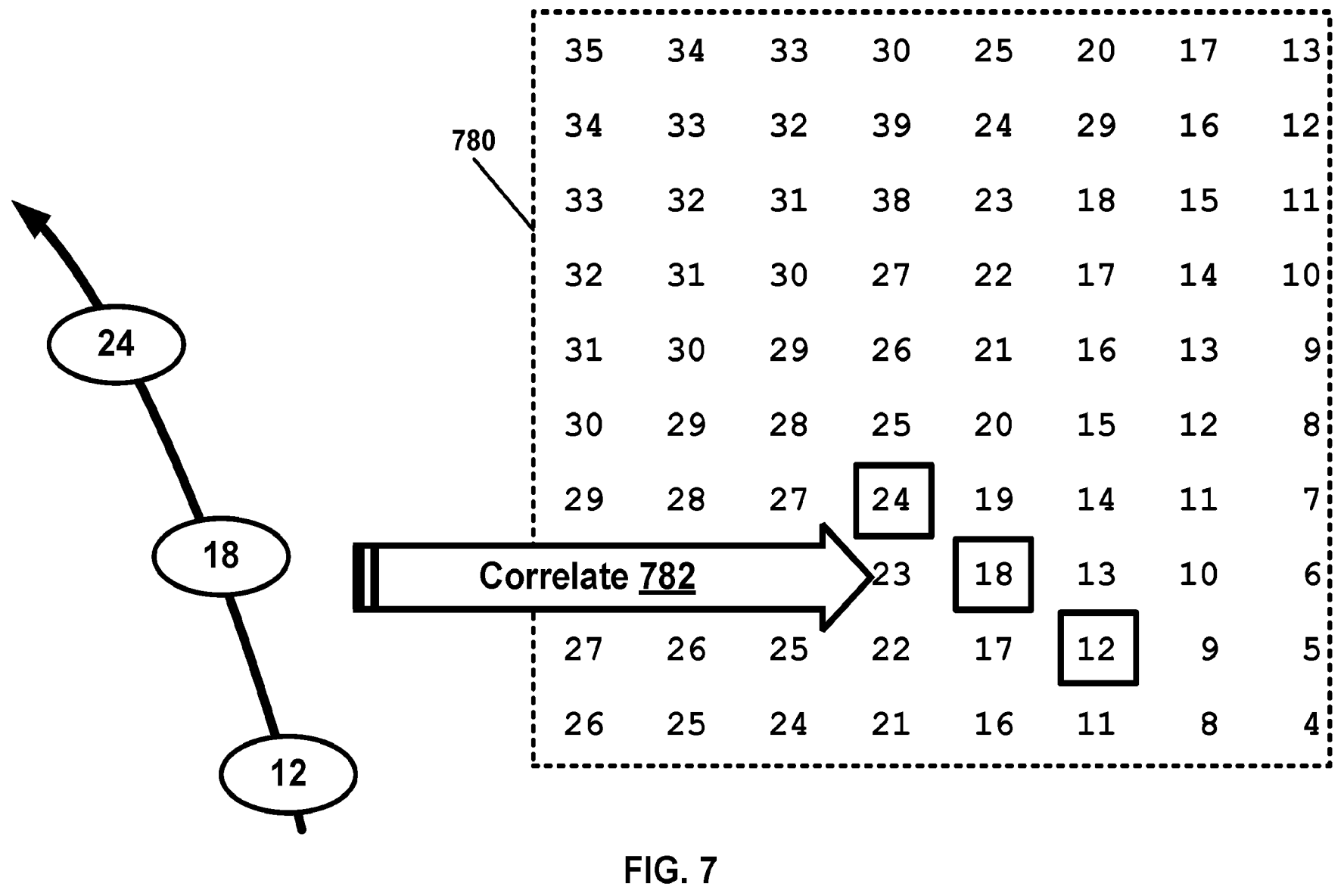

| 13 | 17 | 20 | 25 | 30 | 33 | 34 | 35 |
| 12 | 16 | 29 | 24 | 39 | 32 | 33 | 34 |
| 11 | 15 | 18 | 23 | 38 | 31 | 32 | 33 |
| 10 | 14 | 17 | 22 | 27 | 30 | 31 | 32 |
| 9 | 13 | 16 | 21 | 26 | 29 | 30 | 31 |
| 8 | 12 | 15 | 20 | 25 | 28 | 29 | 30 |
| 7 | 11 | 14 | 19 | 24 | 27 | 28 | 29 |
| 6 | 10 | 13 | 18 | 23 | | | |
| 5 | 9 | 12 | 17 | 22 | 25 | 26 | 27 |
| 4 | 8 | 11 | 16 | 21 | 24 | 25 | 26 |

780

Correlate 782

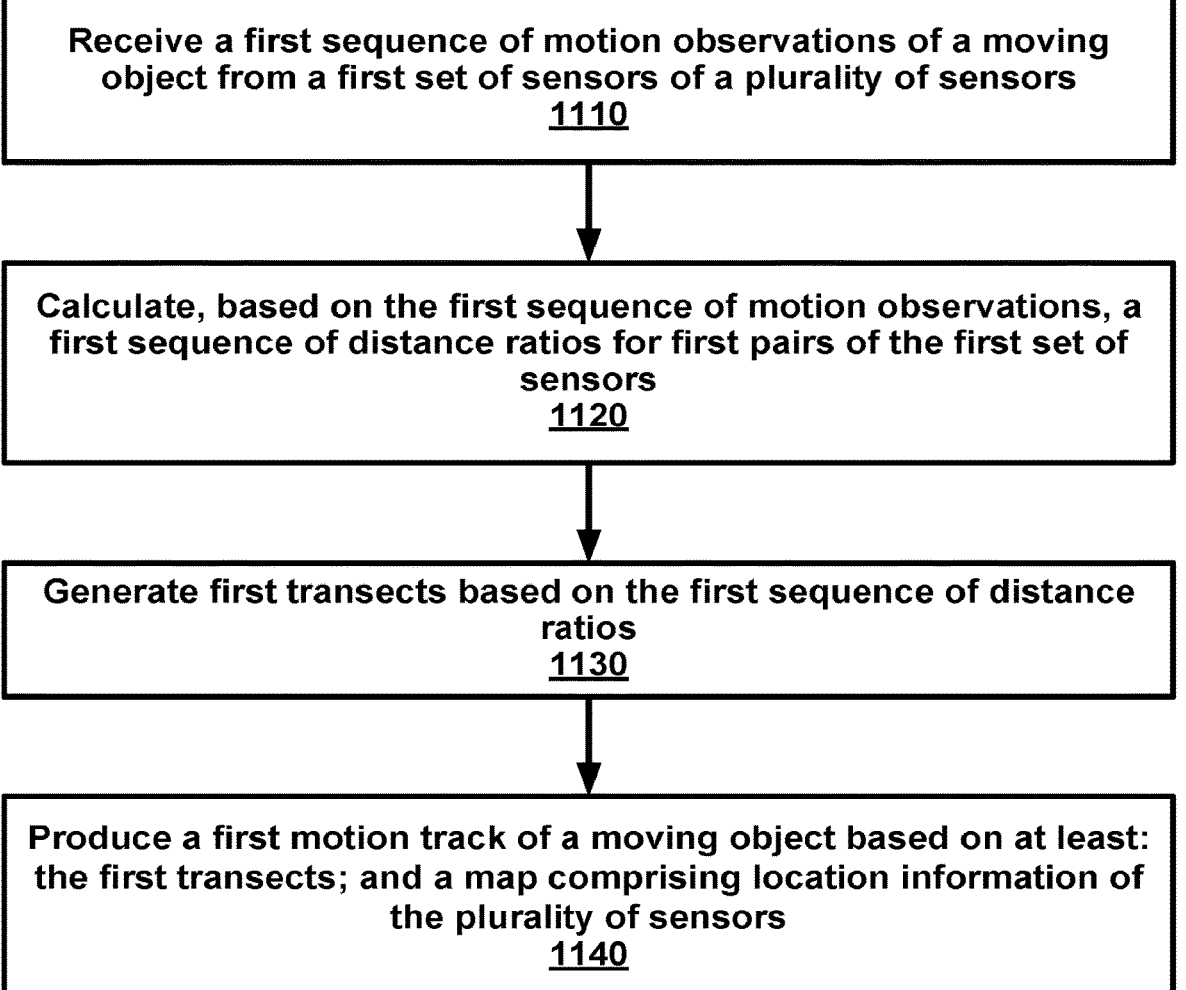

Receive a first sequence of motion observations of a moving object from a first set of sensors of a plurality of sensors
1110

Calculate, based on the first sequence of motion observations, a first sequence of distance ratios for first pairs of the first set of sensors
1120

Generate first transects based on the first sequence of distance ratios
1130

Produce a first motion track of a moving object based on at least: the first transects; and a map comprising location information of the plurality of sensors
1140

FIG. 11

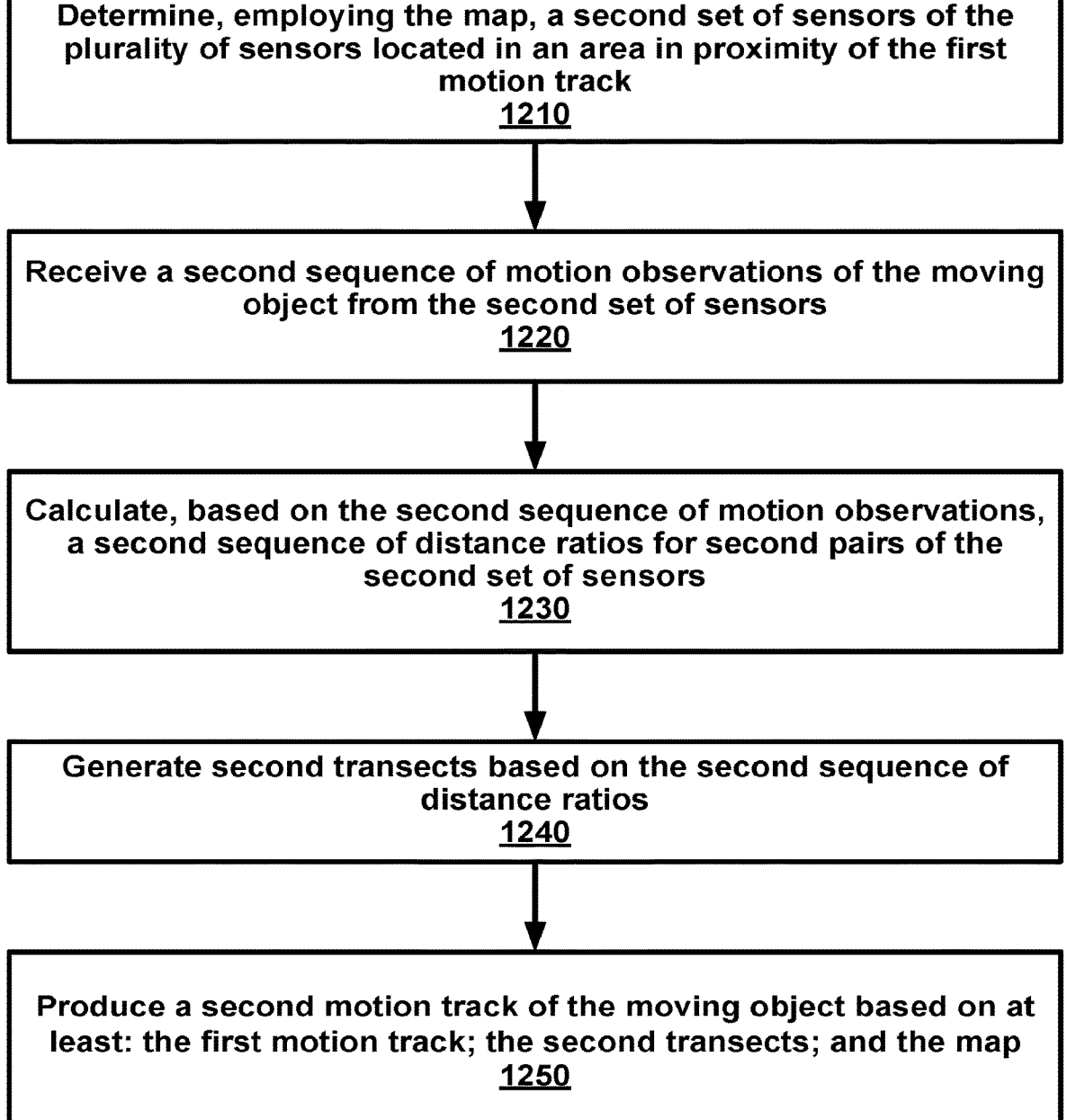

Determine, employing the map, a second set of sensors of the plurality of sensors located in an area in proximity of the first motion track
1210

Receive a second sequence of motion observations of the moving object from the second set of sensors
1220

Calculate, based on the second sequence of motion observations, a second sequence of distance ratios for second pairs of the second set of sensors
1230

Generate second transects based on the second sequence of distance ratios
1240

Produce a second motion track of the moving object based on at least: the first motion track; the second transects; and the map
1250

FIG. 12

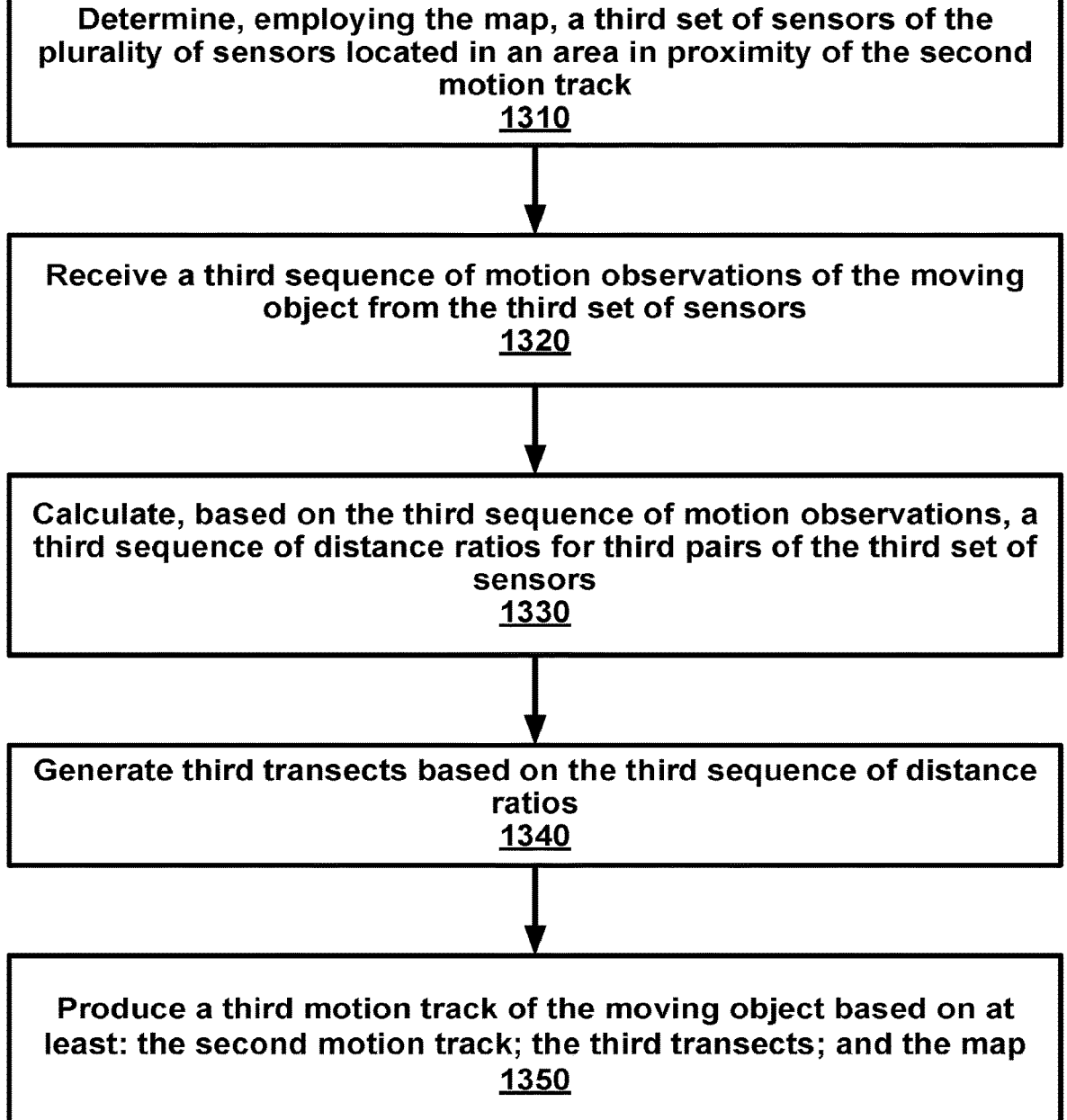

Determine, employing the map, a third set of sensors of the plurality of sensors located in an area in proximity of the second motion track
1310

Receive a third sequence of motion observations of the moving object from the third set of sensors
1320

Calculate, based on the third sequence of motion observations, a third sequence of distance ratios for third pairs of the third set of sensors
1330

Generate third transects based on the third sequence of distance ratios
1340

Produce a third motion track of the moving object based on at least: the second motion track; the third transects; and the map
1350

FIG. 13

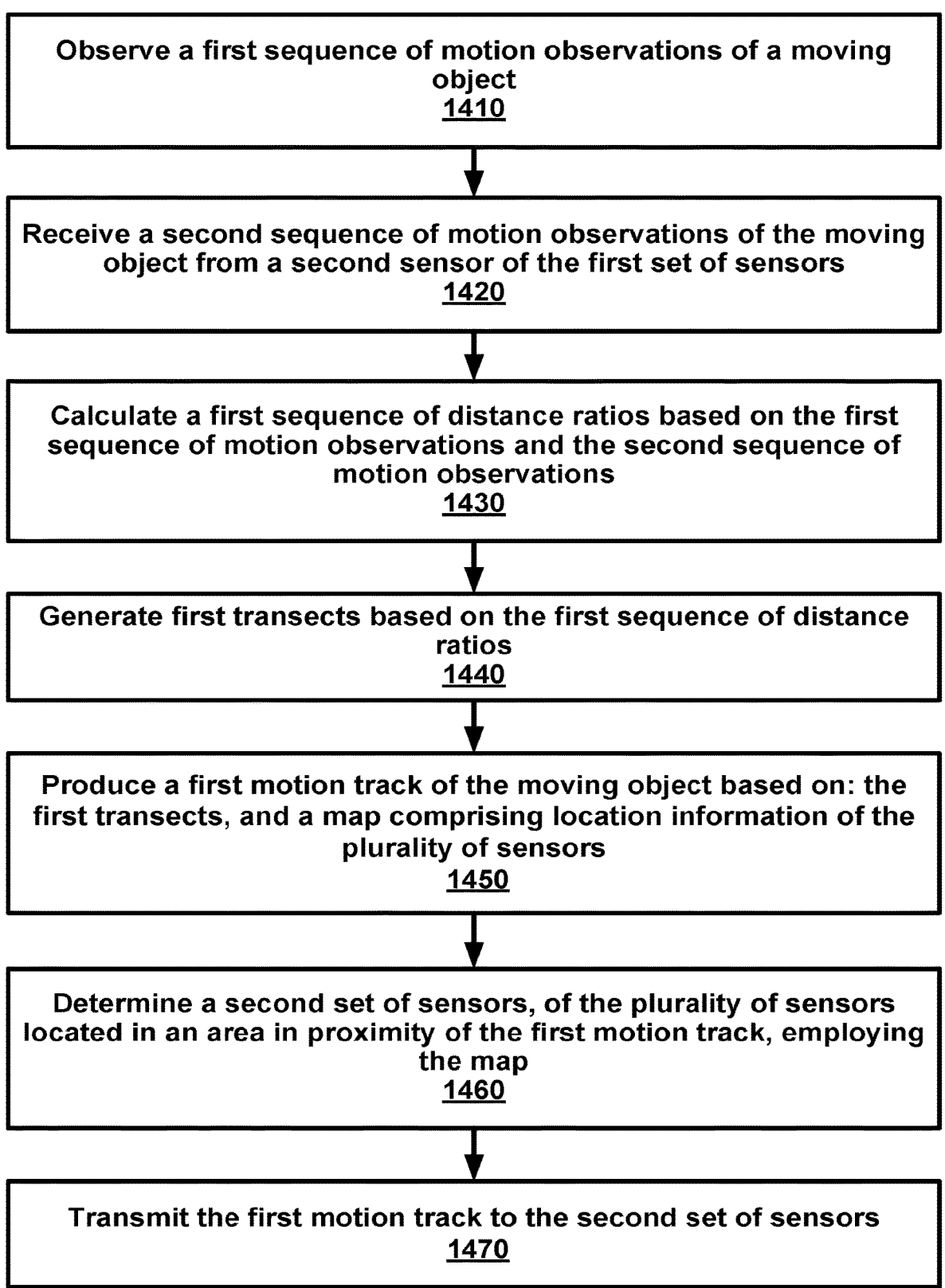

Observe a first sequence of motion observations of a moving object
1410

Receive a second sequence of motion observations of the moving object from a second sensor of the first set of sensors
1420

Calculate a first sequence of distance ratios based on the first sequence of motion observations and the second sequence of motion observations
1430

Generate first transects based on the first sequence of distance ratios
1440

Produce a first motion track of the moving object based on: the first transects, and a map comprising location information of the plurality of sensors
1450

Determine a second set of sensors, of the plurality of sensors located in an area in proximity of the first motion track, employing the map
1460

Transmit the first motion track to the second set of sensors
1470

FIG. 14

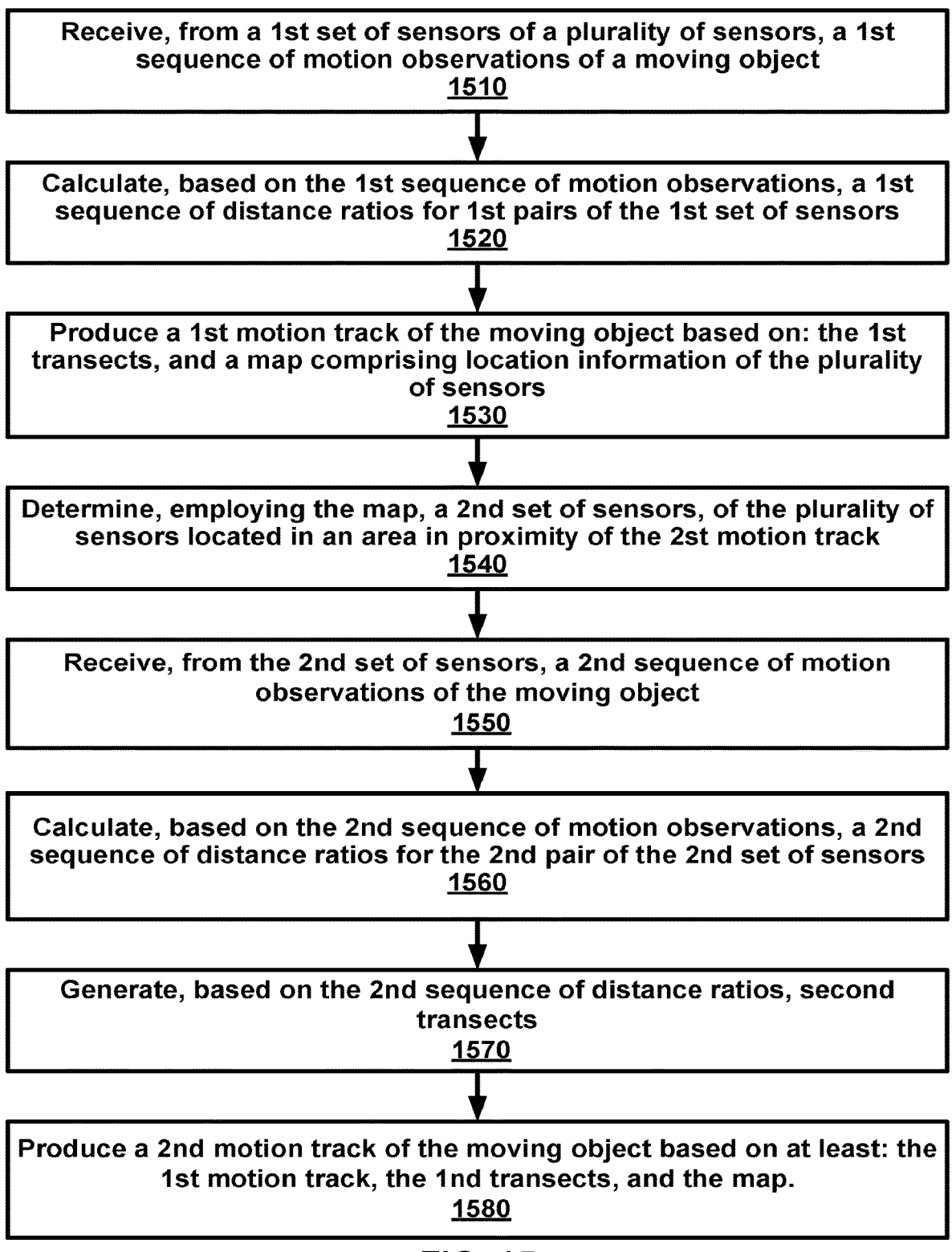

Receive, from a 1st set of sensors of a plurality of sensors, a 1st sequence of motion observations of a moving object
1510

Calculate, based on the 1st sequence of motion observations, a 1st sequence of distance ratios for 1st pairs of the 1st set of sensors
1520

Produce a 1st motion track of the moving object based on: the 1st transects, and a map comprising location information of the plurality of sensors
1530

Determine, employing the map, a 2nd set of sensors, of the plurality of sensors located in an area in proximity of the 2st motion track
1540

Receive, from the 2nd set of sensors, a 2nd sequence of motion observations of the moving object
1550

Calculate, based on the 2nd sequence of motion observations, a 2nd sequence of distance ratios for the 2nd pair of the 2nd set of sensors
1560

Generate, based on the 2nd sequence of distance ratios, second transects
1570

Produce a 2nd motion track of the moving object based on at least: the 1st motion track, the 1nd transects, and the map.
1580

FIG. 15

OBJECT TRACKING IN AN AREA OF DISTRIBUTED SENSORS

CROSS-REFERENCE TO RELATED APPLICATIONS

This application is a continuation of U.S. patent application Ser. No. 17/152,846 filed on Jan. 20, 2021 which is a continuation of U.S. patent application Ser. No. 16/034,166 filed on Jul. 12, 2018 which claims the benefit of U.S. Provisional Application No. 62/532,032, filed Jul. 13, 2017, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

Example

Example FIG. 2 illustrates a calculated range of angular frequency values as at varying distances from an observer 101 of an object traveling past an observer 101 at speeds ranging from 2 m/s and 42 m/s, as per an aspect of an embodiment of the present disclosure.

Example FIG. 3. Illustrates the calculated angular frequency values at varying distances from an observer 101 of an object travelling past an observer 101 at speed equal to 4.5 mis.

Figure 4:
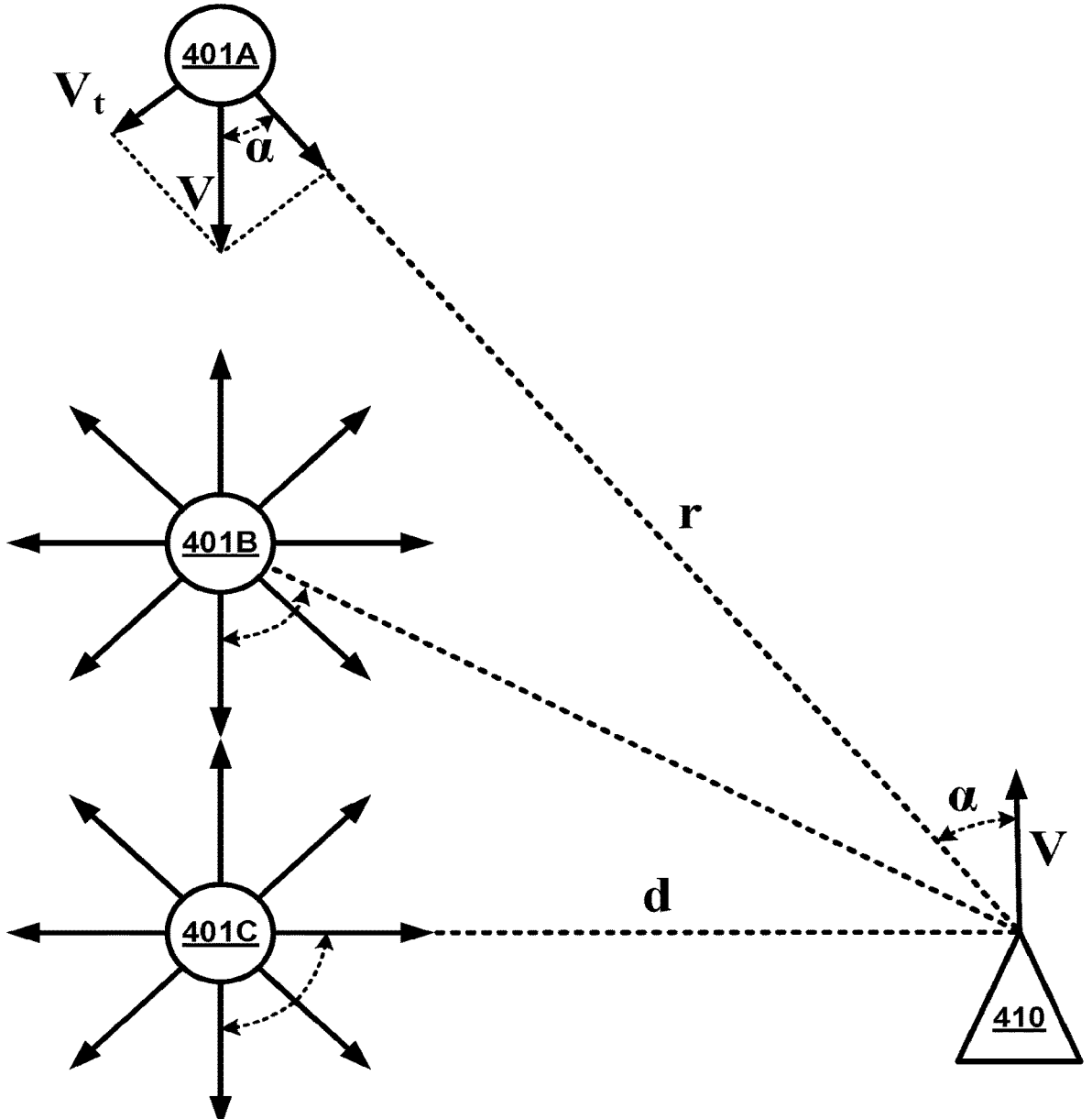

Example FIG. 4 illustrates the relative location and distance of closest approach of an object in reference to sensors positioned on multiple light poles, as per an aspect or an embodiment of the present disclosure.

Figure 5:
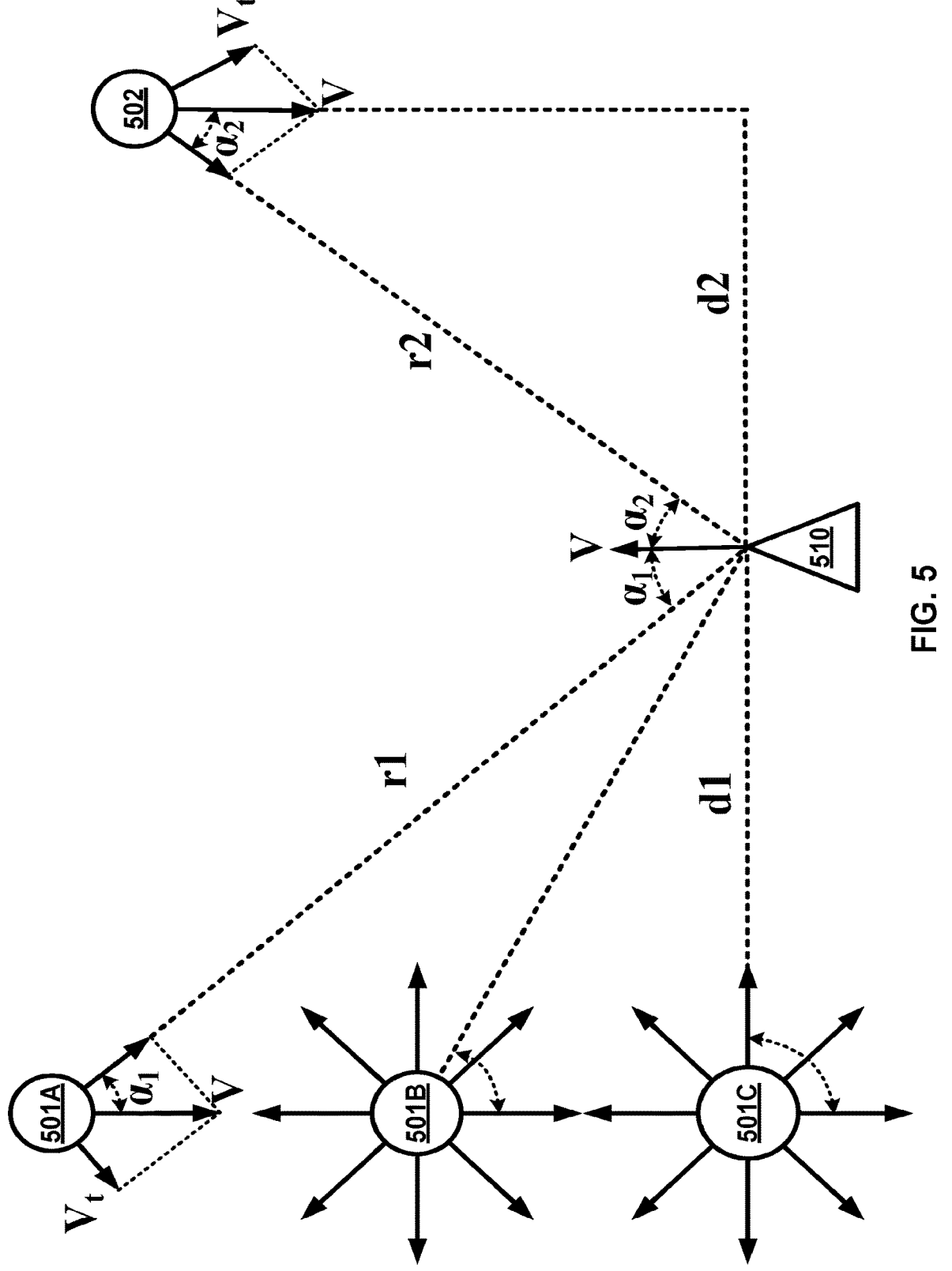

Example FIG. 5 illustrates a sequence of relative positions of an object in reference to sensors positioned on a pair of light poles, as per an aspect of an embodiment of the present disclosure.

Figure 6:
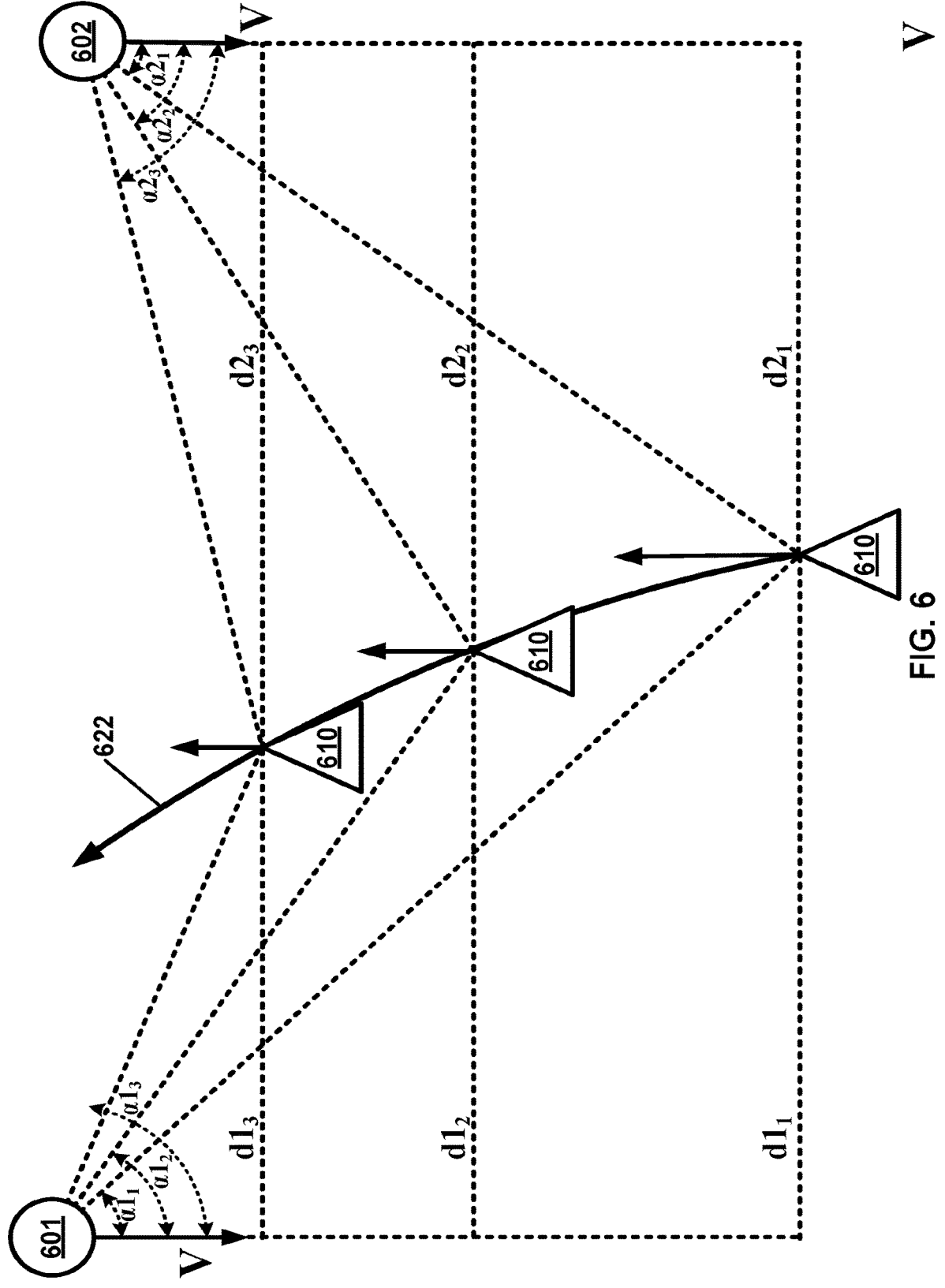

Example FIG. 6 illustrates a sequence of relative locations of an object in reference to sensors positioned on a pair of light poles that may be determined through correlation with a stored dataset, as per an aspect of an embodiment of the present disclosure.

Example FIG. 7 illustrates a sequence of relative location values corresponding to an object in reference to sensors positioned on a pair of light poles that may be correlated with a stored dataset as per an aspect of an embodiment of the present disclosure.

Figure 8:
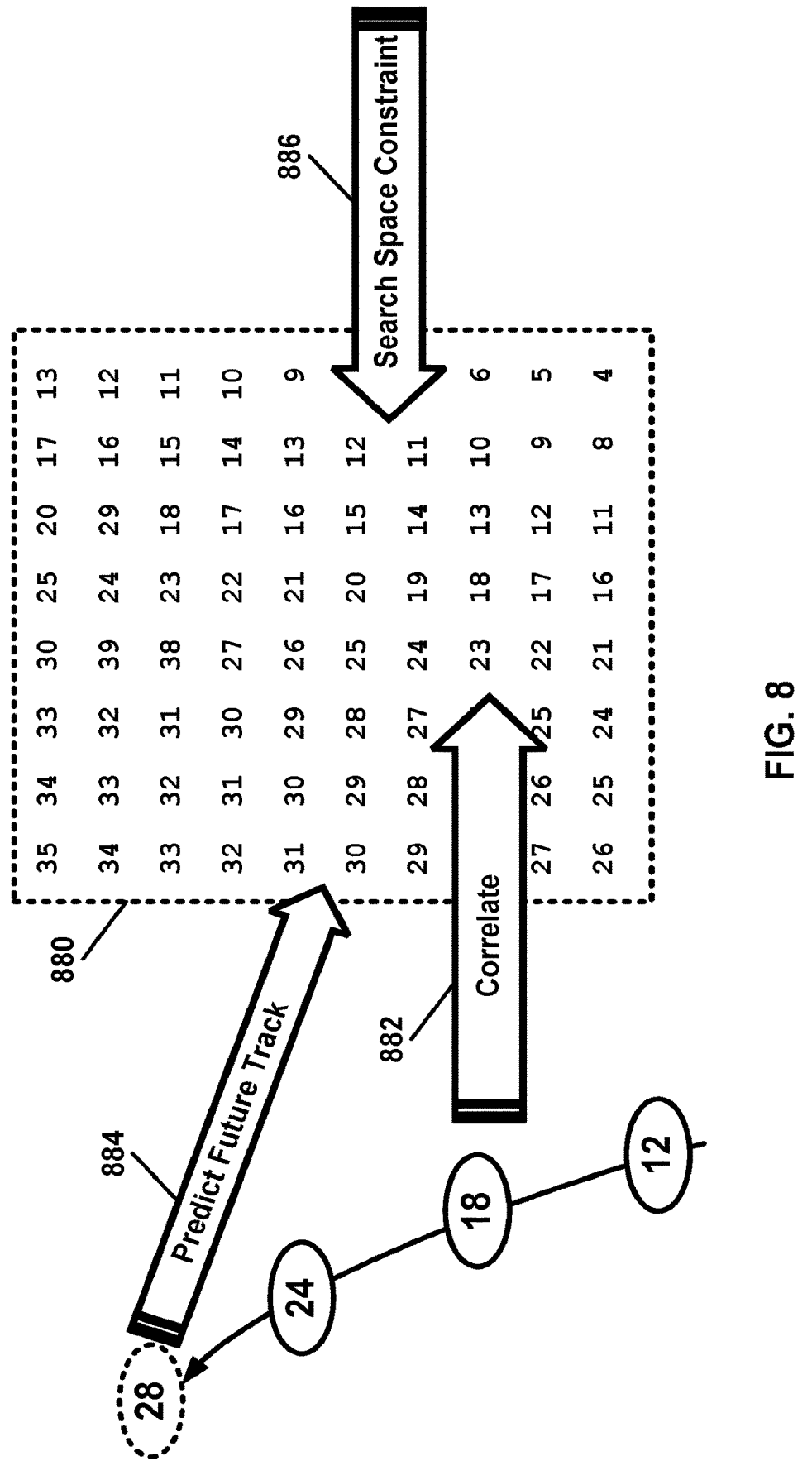

Example FIG. 8 illustrates a sequence of relative location values corresponding to an object in reference to sensors positioned on a pair of light poles that may be correlated with a stored dataset with the application of a constrained search area as per an aspect of an embodiment of the present disclosure.

Figure 9:
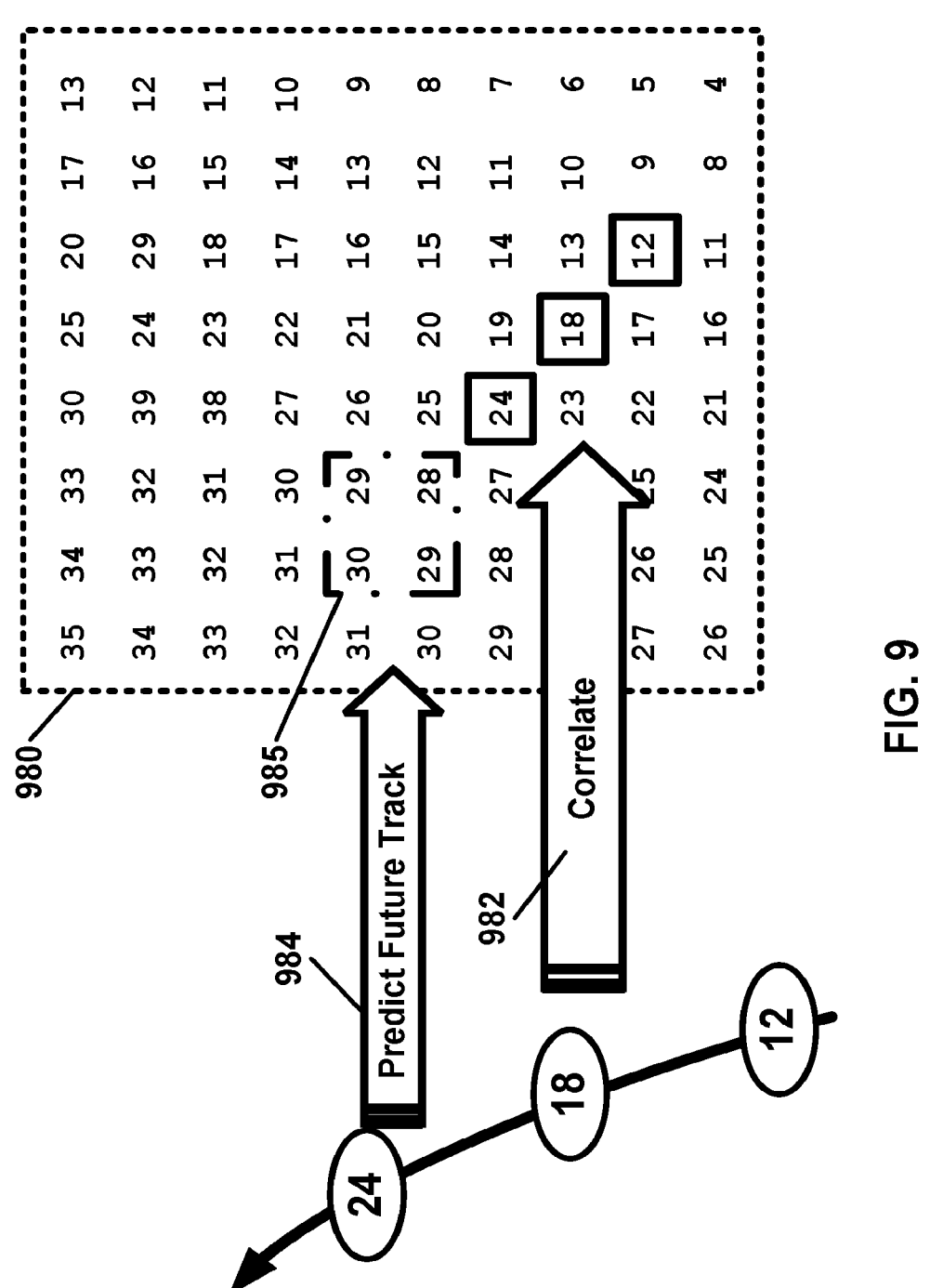

Example FIG. 9 illustrates a sequence of relative location values of an object in reference to sensors positioned on a pair of light poles through correlation with a stored dataset and a predicted track, as per an aspect of an embodiment of the present disclosure.

Figure 10:
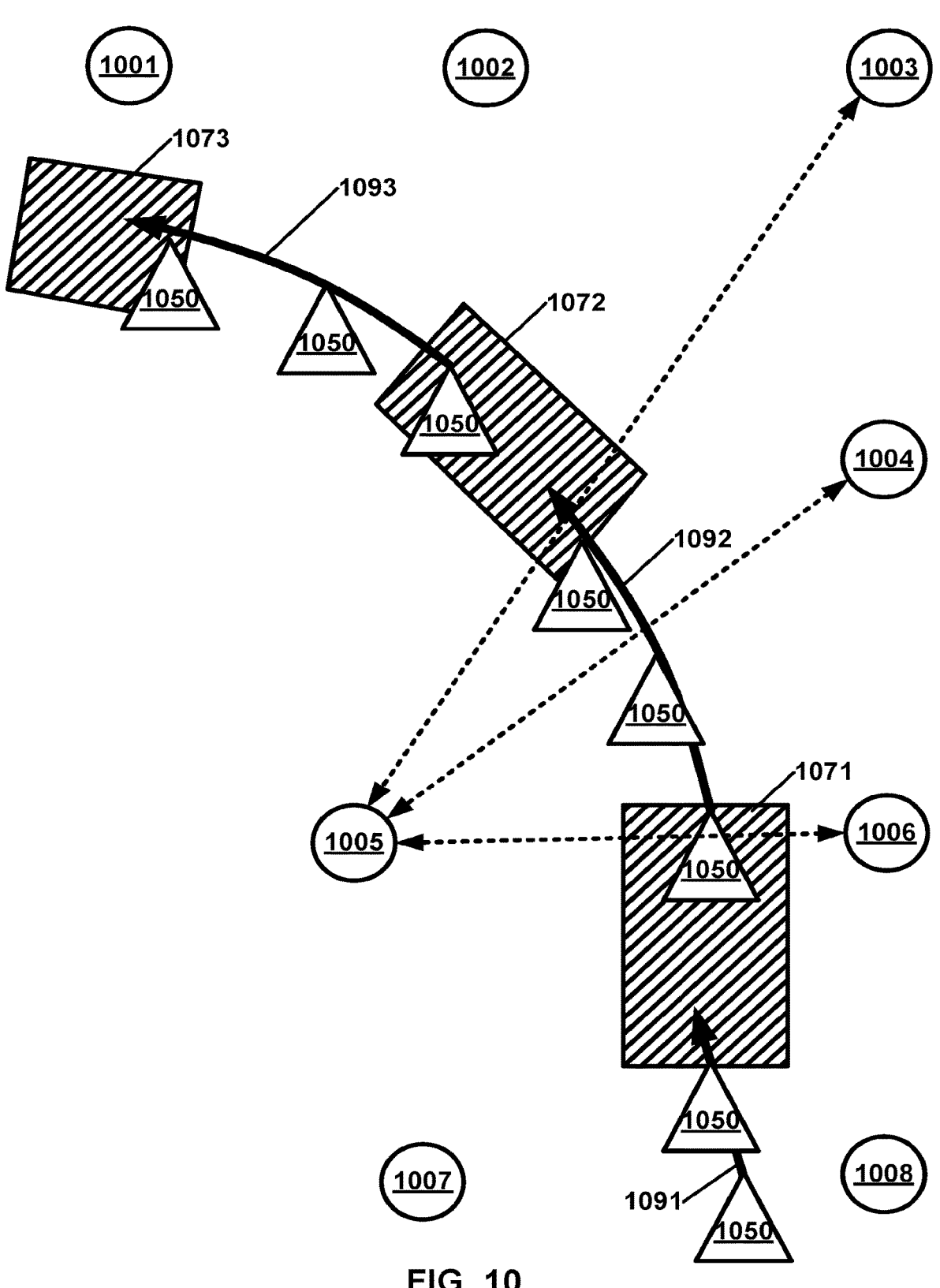

Example FIG. 10 illustrates a determined location and predicted location of an object and the forwarding of alerts to assist with object interdiction, as per an aspect of an embodiment of the present disclosure.

Example FIG. 11 is a flow diagram of an aspect of an embodiment of the present disclosure.

Example FIG. 12 is a flow diagram of an aspect of an embodiment of the present disclosure.

Example FIG. 13 is a flow diagram of an aspect of an embodiment of the present disclosure.

Example FIG. 14 is a flow diagram of an aspect of an embodiment of the present disclosure.

Example FIG. 15 is a flow diagram of an aspect of an embodiment of the present disclosure.

DETAILED DESCRIPTION OF EMBODIMENTS

Example embodiments may be directed to determining the location and predicted movement of one or more objects through a network of sensors. Sensors in the network of sensors may be located within fixed objects, such as, for example, light poles, luminaires, buildings, towers, combinations thereof, and/or the like.

Embodiments may employ one or more maps of street light positions and an angular field of view of sensors mounted on and/or inside street lights as a map of observation fields. An example of a sensor may comprise, for example, a multi-channel microphone array configured to find the angle of arrival and/or departure from an acoustic source. An example of a multi-channel microphone and may comprise a four-channel microphone array. An example of a sensor may comprise, for example, an optical sensor configured to measure direction and relative speed of a moving object. Sensor(s) may be mounted, for example, inside a streetlight.

As an object moves by an observation point, (for example, a street light), the object may move through the perspective views of two or more sensors' observation fields. The apparent motion of the object may be extracted from the angular parallax motion of a signal that is observed from the array of street light sensors' observation fields, or facets. A predicted distance of closest approach of the object to the observer may be related to the angular motion and the velocity of the object. If the same object passes near more than one observer, the ratio of the distance of closest approach from both observers may be related to the velocity of the object and therefore may be related.

A sequence of observations may be collected over a period of time. The period of time may be selected to support the calculation of motion based on observations. For example, the period of time may be based on predicted velocities of the object. The period of time may be based on predicted motion of the object. The sequence may represent a distance of object motion, called a transect.

Transects may be correlated to a dataset based on light positions and sensor fields. A fit may be employed to establish a likely path as it relates to observers. According to an embodiment, two observers may be employed. According to an embodiment, additional observers may be employed. A transect profile that offers a fit may be employed to predict an object track moving forward in time. To the extent that observations are missing and/or ambiguous, a predicted path may become less certain. To increase predictability, a search space may be increased. The search space may be increased to, for example, a maximum search area. The maximum search area may be dynamically determined and/or predetermined.

Multiple observation parrs may result in a series of multiple, discrete, transect tracks. These tracks may be merged into a continuous motion track. The merger may employ, for example, a conditional search to narrow the result. The resulting n lotion track files may be employed to forward signal measurements to neighboring sensors. The neighboring sensors may employ the received motion track files in combination with their own observations to their detection, classification and/or identification filter. This may be employed in refining the signal measurements.

Embodiments may be applied to a range of angle of arrival sensors that may have intermittent signal capture, and/or limited range of sensor coverage. For example, embodiments may be applied to acoustic sensors, radio frequency (RF) sensors, imaging sensors, combinations thereof, and/or the like. Various embodiments may be configured for various applications such as, but not limited to: gunshot detection, unmanned air vehicle (UAV) detection and tracking, creating a motion track from multiple video cameras that do not have overlapping fields of view, combinations thereof, and/or the like.

Embodiments may employ a map of sensor: positions, angular field of view, and coverage areas. For example, a map may comprise street light positions and the angular field or view and coverage areas of sensors mounted Lo light positions as a map of observation fields. An example of a sensor that may be employed may comprise a multi-channel sensor array to determine an angle of arrival from a source. For example, four-channel microphone array may be employed to find the angle of arrival from an acoustic source from a limited distance.

Street lights may comprise, but not be limited to, lighting element(s) raised off of a surface of a given height. These lighting elements may comprise traffic signal lights, traffic lights, street lights, street lamps, Gashing signal lights, or other now known or hereinafter known lighting element(s) that may be generally placed adjacent to an area in a raised position and adapted to signal and/or illuminate an area.

Figure 1:
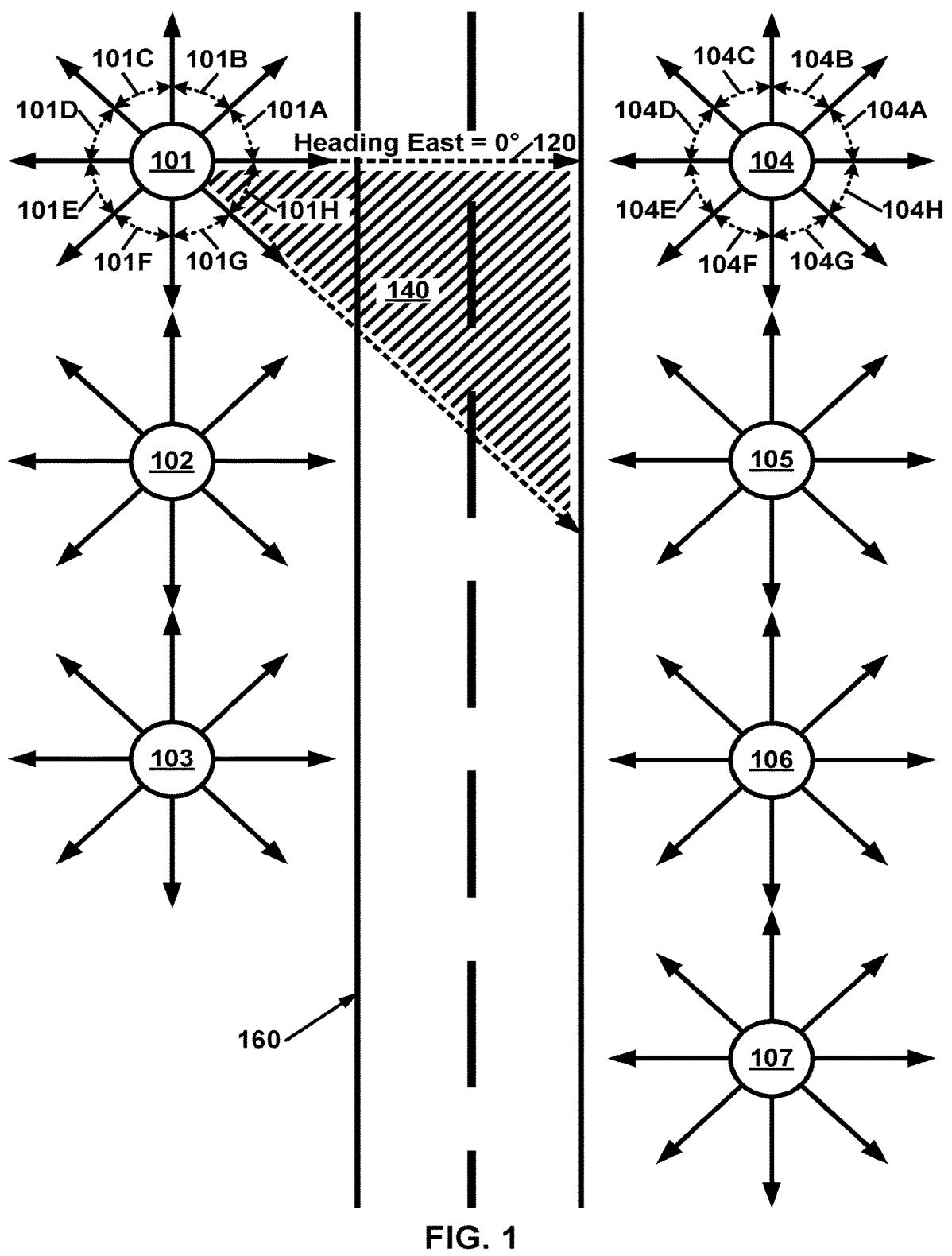
FIG. 1 illustrates an example map or light pole sensors and positions, as per an aspect of an embodiment of the present disclosure.

Example FIG. 1 illustrates several example observers (101, 102, 103, 104, 105, 106, and 107) shown around a street 160. Observers may comprise sensors mounted on street poles and/or light poles. Also illustrated with respect to observer 101, are sensor orientation, instantaneous field of view for elements in the sensor arrays (for example, sensor fields of view represented between angles 101A, 101B, 101C, 101D, 101E, 101F, and 101H), and corresponding coverage areas, or "facets" (140). These elements may be mapped and stored in a database. As an object moves by a sensor mounted in an observation point, (for example, observer 101, 102, 104, 105, 106, and/or 107), the object may move through the perspective views of each of the sensors' observation fields wherein the apparent motion of the object may be extracted from, for example, angular parallax motion of a signal observed from the array of sensors' observation fields, or facets (for example 140). A predicted distance of closest approach of the object to the observer may be related to the angular motion and the velocity of the object.

Each of the angular sectors defined in FIG. 1 surrounding the observer 101 (for example: 101A, 101B, 101C, 101D, 101E, 101F, 1010, and 101H), may represent a direction of arrival that may be determined by, for example, a four-channel microphone array. The direction-of-arrival (DoA) may, for example, be determined by performing a lime-alignment of acoustic signals being sampled on each of the four channels. The four microphones may be positioned, referenced counterclockwise to the heading of a moving object, as 1=45°, 2=135°, 3=225°, and 4=315°. The time-of-arrival (ToA) analysis of the signals at each of the microphone may be employed to resolve the DoA in each of the sectors, 101A through 101H. The duration of time, t, that the signal is present in any sector before moving to a different sector may be measured. The angular motion of the observed signal may be quantified as the change in angle in a given period of time, $\omega = \Delta\alpha/t$.

The range of possible values may be explicitly determined for a given reference grid surrounding an observer (for example, a sensor on a pole) position. Assume for example, the observer 101 is a four-channel acoustic sensor on a pole listening for signals emanating from an unmanned aerial vehicle (UAV). Assume that the minimum detection range is 10 m and maximum detection range is 40 m. Assume also that the UAV travels a minimum of 2 m/s (5 mph) and a maximum of 42 m/s (95 mph). The range of w values for this example as a function of location on a grid surrounding observer 101 is shown in FIG. 2 as Table 1.

In the example described above, values of w may be determined by assuming any specific object velocity and range. Table 2 in FIG. 3 shows co values for a UAV at different grid positions relative to Observer 101 at a constant velocity of 4.5 m/s (~10 mph). The matrix may be symmetric. Applying DoA information that narrows the search area to one of eight angular sectors may eliminate ambiguity and return a unique set of co values that is a subset of the overall table. Assume the sensed DoA sector was 101H. That narrows positions in the 101H grid space (0, 0) to (30, −20). Now introduce a second observer 104, placed 40 m to the east of observer 101 such that observer 101 grid spaces (10, 30) to (−30, 30) may overlap with observer 104 grid spaces (−30, −10) to (−30, 30). Observer 101 DoA sectors 101B, 101A, 101H and 101G, may correspond to observer 104 DoA sectors 104C, 104E, 104F and 104G. Now, assume the observer 104 sensed co as 0.079 in its DoA sector 101H, then there may be a correspondence to an area of the grid (FIG. 3 Table 1, Observer grid space (20, −20)) that may correspond to Observer 104 grid space (−20, −20) where both those values are valid. From this grid location solution obtained through comparing the pairs of results from both observers, subsequent observations may be employed to determine the true velocity and motion track of the UAV Since $V_t = v \sin\alpha$, $\omega = v \sin\alpha/r$, and $r = v \sin\alpha/\omega$, the distance of closest approach, d, may be estimated: $d = r \sin\alpha = v \sin^2\alpha/\omega) = v \sin(\alpha^2/(d\alpha/dt)$. Estimating $d\alpha/dt$ as $\Delta\alpha$ gives: $d = v \sin^2\alpha/\Delta\alpha$.

Some sensors, such as an imager, may have a dense array of detection elements. Rather than measuring the angle of arrival, α, the perceived motion gradient across numerous individual detector facets may be employed to find angular velocity. For this case, the number of facets that detect the object per unit time may be defined as: $u = dn/dt$. The angular density, ρ, of the facets as it relates to a may be defined as: $\rho(\alpha) = dn/d\alpha$. Then, $u = dn/dt = (d\alpha/dt)(dn/d\alpha) = \omega\rho$. This may be employed to relate the distance of closest approach, d, to the angular density distribution of the sensor facets, $\rho = k (1/\sin^2\alpha)$ where k is an arbitrary constant. $d = v(r/u) \sin^2\alpha$. $d = kv/u$. If the same object passes near more than one observer, the ratio of the distance of closest approach from both observers may be related to the velocity of the object and therefore may be related.

Referring now to FIG. 4, an object 410, may move past an observer 401 with a velocity V. 401A represents observer 401 at time t. 401B represents observer 401 at time t+1. 401C represents observer 401 at time t+2. An acoustic array mounted on, for example the observer 401 pole, may make a discrete measurement of angle of arrival, α, at a particular instant in time, t.

Let $v_t$ be the speed component perpendicular to the vector, r. The angular velocity of the object 410 as it appears to the observer 401, X(t), may be defined as the change in angle in a given period of time: $\omega = d\alpha/dt = V_t/r$. The angular velocity of the observed object 410 may vary with both velocity and range to the observer 401.

Example FIG. 5 illustrates two observers 501 and 502 observing the motion of object 510. Object 510 may move past an observer 501 and observer 502 with a velocity V. 502 represents observer 502 at time t. 501A represents observer 501 at time t. 501B represents observer 501 at time t+1. 501C represents observer 501 at time t+2. And $v=d1*\Delta\alpha1/(\sin^2 \alpha1)=d2*\Delta\alpha2/(\sin^2 \alpha2)$, and $d1/dl2=(\Delta\alpha1*(\sin^2 \alpha2))/((\Delta\alpha2*(\sin^2 \alpha1))$.

A sequence of observations from each sensor (illustrated at one location, for example on one pole) may be translated to a sequence of ratios relating the distance of closest approach, d1/d2, obtained from the two participating sensors. As stated earlier, the ratio from observations obtained by a pair of observers may be related to a map grid to estimate location and heading of the observed object. Two or more grid points, obtained from sequence of observations, may be collected from a pair of observers over a short period of time to estimate a line segment corresponding to some distance of object motion, called a transect.

Referring now to FIG. 6, a sequence of observations may correspond to a motion path 622. With 2 observers 601 and 602 (mounted on, for example, light poles), a sequence in terms of distance ratios, DRn may be recorded:

$$DR1=d11/d21$$

$$DR2=d12/d22$$

$$DR3=d13/d23$$

$$DRn=d1n/d2n$$

The sequence of observations may be compared to a dataset of DR values created with the known geographical information about the two observers 601 and 602. Transects may be correlated to a dataset based on actual light positions and sensor fields. A most likely fit calculation may be employed to establish a likely path as it relates to the two observers 601 and 602.

Referring now to FIG. 7, a sequence of observations from a pair of observers may translate to a series of distance ratios, DRn: (for example, 12, 18, 24, . . . ). The sequence may be correlated to a stored dataset (780) of ratios values created from geographical points surrounding the known mapped locations of the pair of observers. The sequence in the dataset (780) that correlates (782) to the observed sequence may be considered to be the transect, or short segment of motion, of the object. A transect profile that offers a fit may be employed to predict the object track moving forward in time. A predicted transect track may be estimated to known values using the gradient of the path as it is seen in the dataset.

Referring now to FIG. 8, a sequence of observations from a pair of observers may translate to a series of distance ratios, DRn: (for example, 12, 18, 24, . . . ). The sequence may be correlated 882 to a stored dataset 880 of ratios values created from geographical points surrounding the known mapped locations of the pair of observers. The sequence in the dataset (780) that correlates (782) to the observed sequence may be considered to be the transect, or short segment of motion, of the object. A transect profile that offers a fit may be employed to predict the object track 884 moving forward in time. A predicted transect track may be estimated to known values using the gradient of the path as it is seen in the dataset.

The search space 880 may be constrained 886 for efficiency. To the extent that observations are missing or ambiguous, the predicted transect track 884 may become less certain and the search space may increase up to a maximum search area. The maximum search area may be predetermined. The maximum search area may be dynamically determined. The maximum search area may be based upon the range of sensors.

Multiple observation pairs may result in a series of multiple, discrete, transect tracks. These tracks may be merged into a continuous motion track employing a conditional search to narrow the result. If the fit has a good certainty factor, then the search space may be narrow, otherwise the search area may grow. Recognizing that transects may be formed by a collection of discrete measurements, there may exist an uncertainty factor in the determination of a continuous path.

Transect points from multiple and/or successive measurements may be joined. The joining may employ a process that may predict future and/or prior paths in the dataset, may account for uncertainty factors, and/or may assign an area in the dataset surrounding the each transect as the search area. If an overlap or search areas among transects occurs, a likelihood process may be employed to measure the level of confidence that the transects should be joined together in a track. Transects may be made of any number of observations, from one measurement to a very large number gathered over several minutes.

The resulting motion track files may be employed as forward signal measurements. Resulting motion track files may be communicated to and/or employed by neighboring sensors. Utilizing the same search area for the predicted track, a flood routing tool may forward signal measurements that were employed to isolate an object of interest. These a priori signal measurements may be added to a detection, classification and/or identification filter to determine if, and/or with what confidence factor, the object observed at future sensors is indeed the same object observed at plior sensors. The confidence factor may be employed as a factor in refining signal measurements.

Referring now to FIG. 9, a sequence of observations from a pair of observers may translate to a series of distance ratios, DRn: (for example, 12, 18, 24, . . . ). The sequence may be correlated to a stored dataset (980) of ratios values created from geographical points surrounding the known mapped locations of the pair of observers. The sequence in the dataset (980) that correlates (982) to the observed sequence may be considered to be the transect, or short segment of motion, of the object. A transect profile that offers a fit may be employed to predict the object track moving forward in time. A predicted transect track may be estimated to known values using the gradient of the path as it is seen in the dataset. A future predicted track 984 may be employed to identify expected ratio values 985 in dataset 980.

The resulting motion track files may be employed to determine forward alerts, assist with object interdiction, provide inputs for automated and/or robotic vehicle control and/or obstacle avoidance systems, or other range of applications. Embodiments may be employed to create and/or add intelligence to surrounding infrastructure that may be exploited as a data utility.

Motion track files may be employed as forward signal measurements to neighboring sensors. Utilizing the same (or overlapping) search area for the predicted track, a flood routing tool may forward signal measurements that were used to isolate an object of interest. These a priori signal measurements may be added to detection, classification and/or identification filter to determine if, and with what confidence factor, the object observed at the future sensors is indeed the object observed at the prior sensors. This confidence factor may comprise an element employed to refine signal measurements.

FIG. 10 illustrates how motion track files may be created by linking more than one transect as an object 1059 moves through an array of distributed observers 1001, 1002, 1003, 1004, 1005, 1006, 1007, and 1008. A transect representing the motion 1091 of object 1050 may be resolved between, for example, observers 1007 and 1008. As 1050 moves out of the sensing ranges of observers 1007 and 1008, the track 1091 may be communicated to the closest sensors along the path 1092 of 1050's current track (for example observers 1005 and 1006). As time grows, the uncertainty of the location of 1050's track may grow. When observer pairs 1005 and 1006 acquire a moving object, they may compare the position to the predicted path and uncertainty region 1071 of 1050 and determine that it is likely to be 1050. In the next moment, 1050 may come into view of observer 1004. This may allow observers 1004, 1005, and 1006 to contribute to an estimated grid location of 1050 creating a new transect. In the next moment, 1050 may come into view of sensor of observer 1003. A new estimated location and subsequent transect may employ contribution from observers 1004, 1005, and 1003. The transects may be combined to a single track file and a new predicted path set. The motion of 1050 may continue out of range of the sensor pairs, but with a smaller uncertainly region 1072 than the first one with motion dynamic information acquired from the extended track file. The object, 1050 may be re-acquired by observers 1001 and 1002 as it continues to move along path 1093 into uncertainty region 1073.

According to various embodiments, a device such as, for example, a tracking sensor, a networked sensor, a processor, a wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 11 is an example flow diagram as per an aspect of an embodiment of the present disclosure. At 1110, a first sequence of motion observations of a moving object may be received from a first set of sensors of a plurality of sensors. At 1120, a first sequence of distance ratios for first pairs of the first set of sensors may be calculated. The calculation may be based on the first sequence of motion observations. At 1130, first transects may be generated based on the first sequence of distance ratios. At 1140, a first motion track of the moving object may be produced based on at least: the first transects; and a map comprising location information of the plurality of sensors.

FIG. 12 is an example flow diagram as per an aspect of an embodiment of the present disclosure. At 1210, a second set of sensors of the plurality of sensors, located in an area in proximity of the first motion track, may be determined. The determination of the second set of sensors may employ the map. At 1220, a second sequence of motion observations of the moving object may be received from the second set of sensors. At 1230, a second sequence of distance ratios for second pairs of the second set of sensors may be calculated. The calculation may be based on the second sequence of motion observations. At 1240, second transects may be generated based on the second sequence of distance ratios. At 1250, a second motion track of the moving object may be produced based on at least: the first motion track, the second transects, and the map.

FIG. 13 is an example now diagram as per an aspect of an embodiment of the present disclosure. At 1310, a third set of sensors of the plurality of sensors, located in an area in proximity of the second motion track, may be determined. The determination of the third set of sensors may employ the map. At 1320, a third sequence of motion observations of the moving object may be received from the third set of sensors. At 1330, a third sequence of distance ratios for third pairs of the third set of sensors may be calculated. The calculation may be based on the third sequence of motion observations. At 1340, third transects may be generated based on the third sequence of distance ratios. At 1350, a third motion track of the moving object may be produced based on at least: the second motion track, the third transects, and the map.

According to an embodiment, the first motion track may be transmitted to the second set of sensors. According to an embodiment, the third motion track of the moving object may be received from a third set of sensors of the plurality of sensors. According to an embodiment, the first motion track may be combined with the second motion track. According to an embodiment, the second motion track may be transmitted to an autonomous vehicle. According to an embodiment, a steerable sensor may be directed, based on at least one of the first motion track and the second motion track, towards a predicted location of the moving object. According to an embodiment, the moving object may be interrogated. According to an embodiment, at least one of the first motion track and the second motion track may be employed to boresight at least one of the following: an optical retroreflector device; an RF retroreflector device; a transceiver, a combination thereof, and/or the like. According to an embodiment, communication may be established with the moving object. The communications may be between one or more of the plurality of sensors and the moving object.

According to an embodiment, at least one of the following may comprise a motion vector: the first transect; and the second transect.

According to an embodiment, the sequence of motion observations may comprise angle of arrival information. According to an embodiment, the sequence of motion observations may comprise observation time information.

According to an embodiment, the second set or the plurality or sensors may comprise at least one of sensors from the first set of the plurality of sensors. According to an embodiment, the plurality of sensors may comprise a multi-channel acoustic sensor. According to an embodiment, the plurality of sensors may determine an angle of arrival of the moving object based on measurements from an array of sensors. According to an embodiment, the plurality of sensors may determine an angle of arrival of the moving object based on measurements from an array or microphones. According to an embodiment, the plurality of sensors may comprise an imager. According to an embodiment, the plurality of sensors may comprise a sensor plane. According to an embodiment, at least one of the plurality of sensors may be configured to sense the presence and direction of arrival of a muzzle blast signal. According to an embodiment, the plurality of sensors may comprise an optical sensor. According to an embodiment, the plurality of sensors may comprise a hyperspectral imager configured to detect a unique spectral signature. According to an embodiment, the plurality of sensors may comprise a radio frequency location device. According to an embodiment, the plurality of sensors may be networked. According to an embodiment, at least one of the plurality of sensors may be a steerable sensor. According to an embodiment, at least one of the plurality of sensors may comprise at least one of the following: a laser radar; an RF radar; a phased array, a combination thereof, and/or the like.

According to an embodiment, the moving object may comprise an unmanned aerial vehicle (UAV). According to an embodiment, the moving object may comprise an aerial vehicle. According to an embodiment, the moving object may comprise a projectile. According to an embodiment, the moving object may comprise a rolling vehicle.

According to an embodiment, the map may comprise a dataset. According to an embodiment, the map may comprise an orientation of at least one of the plurality of sensors. According to an embodiment, the map may comprise a mounting location of at least one of the plurality of sensors. According to an embodiment, the map may comprise relative distances between sensor mounting points. According to an embodiment, the map may comprise relative distances between sensor mounting points as observed from at least two positions. According to an embodiment, the map may comprise a dataset hounded by a detection range of at least two sensors of the plurality of sensors.

According to an embodiment, the location information may be stored in at least one dataset. The dataset may be shared among observers.

According to an embodiment, an observer may comprise a sensor. According to an embodiment, the plurality of sensors may comprise a sensor mounted on a pole. According to an embodiment, the plurality of sensors may comprise a sensor inside a street light luminaire. According to an embodiment, the plurality or sensors may comprise a sensor mounted on the exterior of a building. According to an embodiment, the plurality of sensors may comprise a sensor mounted inside a building. According to an embodiment, the plurality of sensors may comprise a sensor mounted on at least one of the following: a pole, a telephone pole, a transmission tower, a luminaire, a vehicle, a building, a tree, a combination thereof, and/or the like.

FIG. 14 is an example now diagram as per an aspect of an embodiment or the present disclosure. According to an embodiment, a first sensor may be of a first set of sensors of a plurality of sensors. The first sensor may comprise: one or more processors; and memory storing instructions. The instructions, when executed by the one or more processors, may cause the first sensor to perform a series of actions. At 1410, a first sequence of motion observations of a moving object may be observed. At 1420, a second sequence of motion observations of the moving object may be received from a second sensor of the first set of sensors. At 1430, a first sequence of distance ratios may be calculated based on the first sequence of motion observations and the second sequence of motion observations. At 1440, first transects may be generated based on the first sequence of distance ratios. At 1450, a first motion track of the moving object may be produced based on: the first transects, and a map comprising location information of the plurality of sensors. At 1460, a second set of sensors, of the plurality of sensors located in an area in proximity of the first motion track, may be determined employing the map. At 1470, the first motion track may be transmitted to the second set of sensors.

FIG. 15 is an example flow diagram as per an aspect of an embodiment of the present disclosure. According to an embodiment, a system may comprise a plurality of sensors distributed over a geographic area; and a device. The device may comprise one or more processors; and memory storing instructions. The instructions, when executed by the one or more processors, may cause the device to perform a series of actions. At 1510, a first sequence of motion observations of a moving object may be received from a first set of sensors of a plurality of sensors. At 1520, a first sequence of distance ratios for first pairs of the first set of sensors may be calculated based on the first sequence of motion observations. At 1530, a first motion track of the moving object may be produced based on: the first transects, and a map comprising location information of the plurality of sensors. At 1540, a second set of sensors, of the plurality of sensors located in an area in proximity of the first motion track, may be determined employing the map. At 1550, a second sequence of motion observations, of the moving object, may be received from the second set of sensors. At 1560, a second sequence of distance ratios, for second pairs of the second set of sensors, may be calculated based on the second sequence of motion observations. At 1570, second transects may be generated based on the second sequence of distance ratios. At 1580, a second motion track, of the moving object, may be produced based on at least: the first motion track, the second transects, and the map.

While embodiments described above are in terms of specific embodiments, it is to be understood that the claims are not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the claims should be determined by proper interpretation and construction of the appended claims and their legal equivalents, as understood by those of skill in the art relying upon the disclosure in this specification and the attached drawings.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B arc sets and every element of A is also an element of B, A is called a subset of B. In this specification, only non-empty sets and subsets are considered. For example, possible subsets of B={cell1, cell2} are: {cell I}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to".

In this disclosure, various embodiments are disclosed. Limitations, features, and/or elements from the disclosed example embodiments may be combined to create further embodiments within the scope of the disclosure.

Furthermore, many features presented above are described as being optional through the use of "may" or the use of parentheses. For the sake of brevity and legibility, the present disclosure dues not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, F01tran, Java, Basic, Matlab or the like) or a modeling/ simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copy light owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on sensors mounted on lighting poles to track moving objects. However, one skilled in the art will recognize that embodiments of the invention may also be implemented employing sensors throughout a geographic area that are mounted in other locations, such as, for example, inside and around buildings, on towers, and/or the like.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A system to track objects moving through an observable space, comprising:

a first set of sensors of a plurality of sensors configured to observe a first sequence of motion observations of an object moving through the first set of sensors;

a second set of sensors of the plurality of sensors;

one or more devices coupled to one or more of the first set of sensors and the second set of sensors, configured to receive the first sequence of motion observations of the object and to receive a second sequence of motion observations of the object from the second set of sensors, the one or more devices having one or more processors and one or more memories that store instructions that when executed by the one or more processors cause the one or more devices to:

collect the first sequence of observations;

calculate, based on the first sequence of observations, distance ratios between sensors of the first set of sensors, each sensor having known location information and known orientation and a known distance between other sensors of the first set of sensors based at least in part on a reference grid;

generate a first motion track by combining two or more of the distance ratios of the first sequence of observations, the first motion track representative of the angular motion of the object observed by the first set of sensors;

generate a second motion track based on a second sequence of observations from the second set of sensors of the plurality of sensors and based on the reference grid having known locations and known proximity to the first set of sensors, the second motion track representative of the angular motion of the object observed by the second set of sensors; and compare the second motion track to the first motion track to locate the object using the reference grid.

2. The system of claim 1, further comprising instructions that when executed by the one or more processors cause the first set of sensors to perform one or more of share the first motion track with the second set of sensors and share a location of the object based on the first motion track with the second set of sensors.

3. The system of claim 1, where the stored instructions when executed by the one or more processors generate a contiguous motion track by combining the first motion track with the second motion track.

4. The system of claim 1, where the first set of sensors and the second set of sensors include one or more of an optical sensor, an acoustic sensor, a multi-channel acoustic sensor, a radio frequency sensor, an optical imager, a hyperspectral imager, a radio frequency location device, a laser radar, a phased array, or a combination thereof.

5. The system of claim 1, where the first set of sensors or the second set of sensor include a microphone array that generates the first sequence of observations or the second sequence of observations, where the microphone array resolves the direction of arrival of a signal sampled at a particular time.

6. The system of claim 1, where the object is an aerial vehicle, an unmanned aerial vehicle (UAV), a projectile, a moving robot, a handheld device, a wearable device, an autonomous vehicle, or a rolling vehicle.

7. The system of claim 1, where distance ratios between sensors of the first set of sensors is associated with a set of possible values in the reference grid surrounding the location of one or more of the sensors.

8. The system of claim 1, where the first set of sensors and the second set of sensors sense one or more of an acoustic signal or an optical signal or a Bluetooth radio signal.

9. The system of claim 1, where an optical imager obtains one or more of the first sequence of observations and the second sequence of observations and resolves the object using detections within a field of view of a sensor that has been sampled.

10. The system of claim 1, where the stored instructions when executed by the one or more processors direct, based on at least one of the first motion track and the second motion track, a steerable sensor towards a predicted location of the object.

11. The system of claim 1, where the stored instructions when executed by the one or more processors interrogate the object.

12. The system of claim 1, where the stored instructions when executed by the one or more processors establish communication with the object.

13. The system of claim 1, where the first sequence of motion observations or the second sequence of motion observations include one or more of angle of arrival information and observation time information.

14. The system of claim 1, where the second set of the plurality of sensors includes at least one sensor from the first set of sensors of the plurality of sensors.

15. The system of claim 1, where the plurality of sensors include a sensor mounted on at least one of the following: a pole; a telephone pole; a transmission tower; a luminaire; a vehicle; a building; and a tree.

\* \* \* \* \*